(12) United States Patent
Renders et al.

(10) Patent No.: US 11,697,720 B2
(45) Date of Patent: Jul. 11, 2023

(54) FLEXIBLE POLYOLEFIN THERMAL INSULATION FOAM AND USE THEREOF, AND A METHOD FOR PRODUCING A FLEXIBLE POLYOLEFIN THERMAL INSULATION FOAM

(71) Applicant: Thermaflex International Holding B.V., Waalwijk (NL)

(72) Inventors: Maikel Josef Paulus Johannes Renders, Valkenswaard (NL); Tomasz Duzak, Waalwijk (NL); Musa Aksoy, Waalwijk (NL)

(73) Assignee: THERMAFLEX INTERNATIONAL HOLDING B.V.

(*) Notice: Subject to any disclaimer, the term of this patent is extended or adjusted under 35 U.S.C. 154(b) by 560 days.

(21) Appl. No.: 16/645,351

(22) PCT Filed: Sep. 6, 2018

(86) PCT No.: PCT/NL2018/050576
§ 371 (c)(1),
(2) Date: Mar. 6, 2020

(87) PCT Pub. No.: WO2019/050402
PCT Pub. Date: Mar. 14, 2019

(65) Prior Publication Data
US 2020/0283593 A1    Sep. 10, 2020

(51) Int. Cl.
*C08J 9/14* (2006.01)
*C08L 23/08* (2006.01)
*C08J 9/00* (2006.01)

(52) U.S. Cl.
CPC ............. *C08J 9/141* (2013.01); *C08J 9/0023* (2013.01); *C08J 9/0061* (2013.01); *C08L 23/0815* (2013.01); *C08J 2201/03* (2013.01); *C08J 2203/14* (2013.01); *C08J 2205/052* (2013.01); *C08J 2323/08* (2013.01); *C08J 2423/06* (2013.01); *C08L 2201/02* (2013.01); *C08L 2201/08* (2013.01); *C08L 2203/18* (2013.01); *C08L 2205/025* (2013.01); *C08L 2205/08* (2013.01); *C08L 2207/04* (2013.01); *C08L 2207/066* (2013.01)

(58) Field of Classification Search
CPC ........ C08J 9/141; C08J 9/0023; C08J 9/0061; C08J 2201/03; C08J 2203/14; C08J 2205/052; C08J 2323/08; C08J 2423/06; C08J 2323/06; C08J 2353/00; C08J 2453/00; C08L 23/0815; C08L 2201/02; C08L 2201/08; C08L 2203/18; C08L 2205/025; C08L 2205/08; C08L 2207/04; C08L 2207/066; C08L 2203/14; C08L 2314/06; C08L 53/00
See application file for complete search history.

(56) References Cited

U.S. PATENT DOCUMENTS

| 6,124,390 A | 9/2000 | Nagashima et al. ...... C08K 3/00 |
| 8,318,857 B2 | 11/2012 | Seidel et al. ............ C08L 51/04 |
| 10,011,696 B2 | 7/2018 | Leser et al. ................ C08J 9/04 |
| 2006/0205833 A1* | 9/2006 | Martinez ................... C08J 9/04 521/142 |

FOREIGN PATENT DOCUMENTS

| EP | 2 070 976 | 6/2009 | ................ C08J 9/12 |
| RU | 2190639 | 3/1996 | ............... C08K 9/04 |
| RU | 2009131222 | 2/2011 | ............. C08L 69/00 |
| RU | 2015119420 | 12/2016 | ............. C09K 11/02 |
| WO | 02/42679 | 5/2002 | ............. F16L 59/02 |
| WO | 2006/102151 | 9/2006 | ................ C08J 9/00 |

OTHER PUBLICATIONS

International Search Report and Written Opinion issued in PCT/NL2018/050576, dated Nov. 23, 2018, 11 pgs.
International Preliminary Report on Patentability issued in PCT/NL2018/050576, dated Dec. 6, 2018, 16 pgs.
Swogger, Kurt W., "An Outlook for Metallocene and Single Site Catalyst Technology into the 21$^{st}$ Century", *Metallocene Technology*, pp. 283-291 as cited in Antec 98, Processing Metallocene Polyolefines, Conference Proceedings, Oct. 1999, Rapra Technology, and Proceedings of 2$^{nd}$ International Congress on Metallocene Polymers, Scotland Conference Proceedings, Mar. 1998, 9 pgs.

* cited by examiner

*Primary Examiner* — Irina S Zemel
(74) *Attorney, Agent, or Firm* — Hayes Soloway P.C.

(57) ABSTRACT

Disclosed is a polyolefin thermal insulation foam and use thereof, and to a method for preparing a physically foamed polyolefin thermal insulation foam, which can be recycled well and which has excellent flexibility characteristics.

17 Claims, 2 Drawing Sheets

FLEXIBLE POLYOLEFIN THERMAL INSULATION FOAM AND USE THEREOF, AND A METHOD FOR PRODUCING A FLEXIBLE POLYOLEFIN THERMAL INSULATION FOAM

The present invention relates to a polyolefin thermal insulation foam and use thereof, and to a method for preparing a physically foamed polyolefin thermal insulation foam.

For the thermal insulation of pipes such as hot water conduits, high and low pressure steam pipes, and pipes for split-air conditioning, district heating, solar energy exploitation and the process industry, hollow profiles having a wall of synthetic foam are used on a large scale.

The most common types of pipe insulation that are currently commercially available are polyethylene (PE) pipe insulation and rubber pipe insulation.

PE pipe insulation consists of foam that is composed of thermoplasts and has a density of approximately 35 kg/m$^3$. This type of foam is usually produced using physical blowing agents (for instance iso-butane) and is not crosslinked. This type of foam has good product properties such as insulation value, fire behaviour, water vapor transmission and water absorption capacity. The foam can be recycled excellently due to its non-crosslinked nature. The foam is prepared in a single process, i.e. the production takes place in one step. A drawback of PE pipe insulation material is however that it is less flexible than rubber pipe insulation as a result of which it is difficult to apply around thin and twisting pipes. As a result the material is not suitable for some uses such as for instance air conditioning and cooling.

Rubber pipe insulation consists of foam that is composed of elastomers and has a density of about 60 kg/m$^3$. This type of foam is often produced using chemical blowing agents (for instance azo-compounds) and usually is crosslinked. Rubber pipe insulation is a very flexible material that is easy to apply. This type of foam has good product properties such as insulation value and fire behaviour. A drawback of rubber pipe insulation is that it cannot be recycled and that it is relatively heavy (that means that a lot of material is necessary for insulation). The water absorption capacity is good as such, but in case of damage to its skin the material behaves like a sponge and good properties are lost. Another drawback of rubber pipe insulation is that this material is produced using a method comprising three steps: kneading, extruding and foaming. In combination with the high density this makes the cost price of rubber pipe insulation higher than that of PE pipe insulation.

A pipe insulation that is flexible, has excellent thermal insulation capacity, and that can be recycled well was described in WO02/42679 of the present applicant. The polyolefin foam disclosed therein is made from a basis of metallocene polyethylene. WO02/42679 discloses in particular a thermal insulation foam which is made by extruding, using a physical blowing agent, a foam composition comprising a metallocene polyethylene, a flame extinguisher and a cell stabilizer, characterised in that said composition comprises 77-92% by weight of metallocene polyethylene, 5-10% by weight of flame extinguisher, and 3-8% by weight of cell stabilizer.

The present inventors have however found that there is still a need for improvement with regard to the flexibility of the foam. The present invention therefore aims to provide a foam which has excellent thermal insulation capacity, which can be recycled well and which has excellent flexibility characteristics.

SUMMARY OF THE INVENTION

In a first aspect the invention therefore provides a non-crosslinked polyolefin thermal insulation foam having a percentage of open cells of less than 10% based on the total cells in the foam, obtainable by extruding a mixture comprising:

i) an ethylene/α-olefin block copolymer, which comprises blocks of:
  A) crystalline or semi-crystalline blocks characterized by comprising ethylene in an amount of higher than 95 weight %; and
  B) elastomeric blocks characterized by comprising ethylene in an amount of 95 weight % or less and a comonomer content of 5 weight % or higher;

ii) one or more random polymers with a density of between 0,880 g/cm$^3$ and 960 g/cm$^3$, selected from the group of a metallocene polyethylene and/or a polyethylene; and iii) a cell stabilizer, in a process comprising the steps of
a) melting said mixture in the melting zone(s) of the extruder adjusted to temperatures of 160 to 220° C., at a pressure increasing from 1 bar up to 400 bar,
b) injecting said physical blowing agent at an injection temperature of 140 to 220° C. and an injection pressure of 30 to 300 bar,
c) cooling the molten mixture in one or more cooling zones adjusted to temperatures of 85 to 115° C., and
d) extruding the mixture through an extrusion nozzle adjusted to a temperature of 85 to 115° C. and a pressure sufficiently high to keep any gas present in the mixture dissolved in the mixture.

In a second aspect, the invention relates to a method for producing a non-crosslinked polyolefin thermal insulation foam comprising extruding, using a physical blowing agent, a mixture as defined under the first aspect of the invention, in an extruder, comprising the steps of
a) melting said mixture in the melting zones of the extruder adjusted to temperatures of 160 to 220° C., at a pressure increasing from 1 bar up to 400 bar,
b) injecting said physical blowing agent at an injection temperature of 140 to 220° C. and an injection pressure of 30 to 300 bar,
c) cooling the molten mixture in one or more cooling zones adjusted to temperatures of 85 to 115° C., and
d) extruding the mixture through an extrusion nozzle adjusted to a temperature of 85 to 115° C. and a pressure sufficiently high to keep any gas present in the mixture dissolved in the mixture.

In a third aspect the invention relates to the use of the non-crosslinked polyolefin thermal insulation foam for thermal isolation.

The inventors have surprisingly found that while an ethylene/α-olefin block copolymer as defined above alone cannot be foamed to a suitable thermal insulation foam, when such a block copolymer is combined into a composition with one or more olefin based random polymers with a density of between 0,880 g/cm$^3$ and 960 g/cm$^3$, this composition results in an excellent thermal insulation foam. The resulting composition behaves well in an extruder.

Moreover, by using the abovementioned polymers, cooling the molten mixture during the preparation process to a temperature near to and below the point of crystallisation of the polymers (i.e. 85 to 115° C.), and extruding at an extruder pressure sufficiently high to keep any gas present in the mixture dissolved in the mixture, the mixture expands at a pressure of 1 atm to a foam with very low percentages of open cells (<10%) or in other words a foam with percentages of closed cells of 90% or more based on the total number of cells. The foam of the invention therefore can be indicated as a "closed cell foam". Due to the high percentage of closed cells the foam of the invention has the advantages that it is highly impermeable to moisture and that it has a high insulation value. This makes the foam of the invention highly suitable for insulation purposes in humid environments.

In general, closed cell foams known in the prior art are inherently rigid in nature and hardly pliable. This makes these prior art foams unsuitable for insulation of bended structures or structures of irregular shapes. In contrast, the foam of the present invention is highly flexible in combination with a closed cell structure. Due to the high flexibility of the foam, pipe insulation made from the foam according to the invention is easier applied around twisting pipes than pipe insulations from existing polyolefin based foams such as the one described in WO02/42679. Analogous, when the foam is made in the form of a sheet, such sheets can be easier applied over irregular surfaces. Because the foam is prepared using physical blowing agents and is not chemically crosslinked, it can be recycled easily.

DETAILED DESCRIPTION

Figure 1:
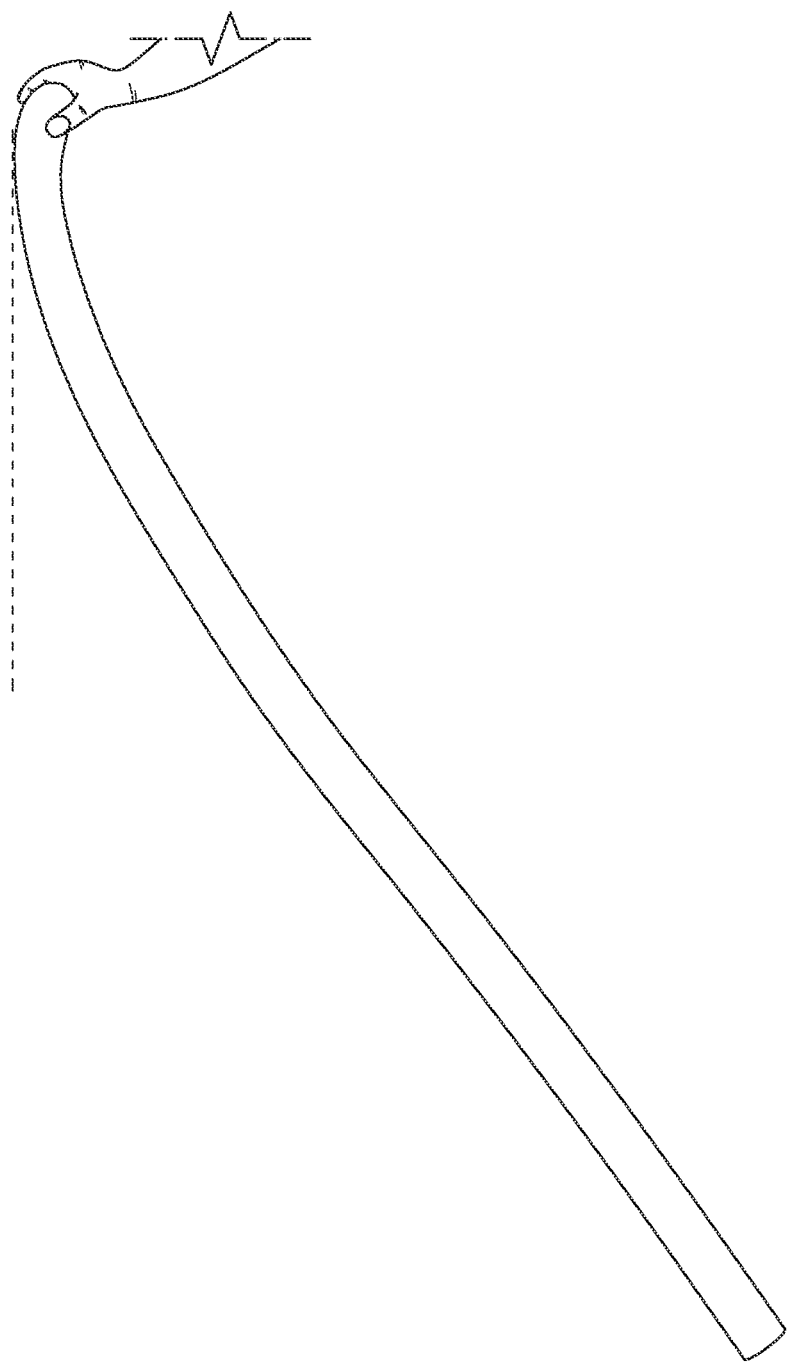
FIG. 1: Flexibility of a pipe insulation of a prior art foam.

The mixture used for obtaining the foam according to the invention comprises: i) an ethylene/α-olefin block copolymer, ii) one or more olefin based random polymers; and iii) one or more cell stabilizer.

The ethylene/α-olefin block copolymer comprises blocks of: crystalline or semi-crystalline blocks characterized by comprising ethylene in an amount of higher than 95 weights based on the weight of said crystalline or semi-crystalline blocks; and elastomeric blocks characterized by comprising ethylene in an amount of 95 weight % or less and a comonomer content of 5 weight % or higher based on the weight of said elastomeric blocks. The terms "soft blocks" and "elastomeric blocks" can be used interchangeably. The terms "hard blocks" and "crystalline or semi-crystalline blocks" can also be used interchangeably.

The comonomer content in the hard blocks is less than 5 weight percent based on the weight of said hard blocks, and preferably less than 2 weight percent. The hard blocks may be comprised of only ethylene or substantially only ethylene. Elastomeric blocks (soft blocks), on the other hand, are blocks of polymerized units in which the comonomer content is higher than 5 weight percent of the weight of the soft blocks, preferably higher than 8 weight percent, higher than 10 weight percent, or higher than 15 weight percent. The comonomer content in the soft blocks may even be higher than 20 weight percent, higher than 25 eight percent, higher than 30 weight percent, higher than 35 weight percent, higher than 40 weight percent, higher than 45 weight percent, higher than 50 weight percent, or higher than 60 weight percent.

The term "crystalline" refers to a block that possesses a first order transition or crystalline melting point (Tm) as determined by differential scanning calorimetry (DSC) or equivalent technique. The term may be used interchangeably with the term "semicrystalline".

The hard blocks may suitably be present in an amount from 5% to 85% by weight of the block copolymer. The hard blocks and soft blocks may be connected in a linear fashion to form a linear chain and be randomly distributed along this chain. The block copolymer suitably comprises said hard and soft blocks in an alternating fashion.

Preferably, the hard blocks comprise at least 98% of ethylene by weight, and the soft blocks comprise less than 95%, preferably less than 50%, of ethylene by weight.

It is preferred that in the block copolymer the α-olefin comonomer is a $C_3$-$C_{10}$ α-olefin. Suitable $C_3$-$C_{10}$ α-olefins include styrene, propylene, 1-butene, 1-hexene, 1-octene, 4-methyl-1-pentene, norbornene, 1-decene, 1,5-hexadiene or a mixture thereof. In a particularly preferred embodiment said α-olefin is 1-octene.

Preferably, ethylene comprises the majority molar fraction of the block copolymer. In this respect it is preferred that ethylene comprises at least 50 mole percent of the whole block copolymer. More preferably ethylene comprises at least 60 mole percent, at least 70 mole percent, or at least 80 mole percent, with the substantial remainder of the whole polymer comprising at least one other comonomer that is $C_3$-$C_{10}$ α-olefin. In case the block copolymer is an ethylene/1-octene block copolymer, suitable ethylene/1-octene block copolymers may comprise an ethylene content greater than 80 mole percent of the whole polymer and a 1-octene content of from 10 to 15 mole percent, preferably from 15 to 20 mole percent of the whole polymer.

In a particularly preferred embodiment said ethylene/α-olefin block copolymer comprises alternating blocks of hard blocks of linear medium-density polyethylene and soft blocks of ethylene/1-octene. Medium-density polyethylene (MDPE) is a type of polyethylene defined by a density range of 0,926-0,940 g/cm$^3$ (as measured according to ASTM D792).

Suitable ethylene/α-olefin block copolymers have a density between 0.800 and 0.880 g/cm$^3$ as measured according to ASTM D792. Other physical properties of suitable ethylene/α-olefin block copolymers include a melt index (g/10 min (2.16 kg at 190°) as determined in accordance with ASTM D1238 between 0.5 and 30, preferably between 0.5 and 5 or a DSC melting point between 115 and 125° C., such as between 118 and 122° C., preferably both of these physical properties.

Suitable ethylene/α-olefin block copolymers with such properties are commercially available and may be provided in the form of granules.

The inventors have observed that said ethylene/α-olefin block copolymer as defined above on it itself cannot be foamed to a suitable thermal insulation foam, because this block copolymer does not retain gas. The present invention overcomes this problem by the addition of one or more random polymers with a density of between 0,880 g/cm$^3$ and 0.960 g/cm$^3$ (densities are as measured according to ASTM D792), selected from the group of a metallocene polyethylene and/or a polyethylene.

It is to be understood that the term "polyethylene" in this application encompasses both ethylene copolymers and ethylene homopolymers. In case of a random copolymer, it is preferred to use an ethylene/$C_3$-$C_{10}$ α-olefin random copolymer. Suitable $C_3$-$C_{10}$ α-olefins in this respect include styrene, propylene, 1-butene, 1-hexene, 1-octene, 4-methyl-1-pentene, norbornene, 1-decene, 1,5-hexadiene or a mixture thereof. In a particularly preferred embodiment in the random polymer said α-olefin is 1-octene.

The random polyethylene polymer component contributes to enhanced melt strength of the produced foam and contributes to foamability. It is preferred that said polyethylene is LDPE. LDPE is defined by a density range of 0,910-0,940 g/cm$^3$. A suitable LDPE may have a melt flow index (MFI) as determined in accordance with ASTM D1238 of less than 1.2, such as 0.65 and a melting temperature between 108 and 118° C., such as between 110 and 115° C. The inventors have observed that a foaming composition of the ethylene/α-olefin block copolymers in combination with LDPE retains gas well, so that a foam can be produced with sufficient thermal insulation capacity. The inventors have found that metallocene polyethylene also contributes particularly to achieving high foamability of materials with low material density such as the α-olefin block copolymer component. The term "metallocene polyethylene" refers to polyethylenes that are prepared by polymerising ethylene in the presence of a metallocene catalyst. For preparing and processing metallocene polyethylene reference is made to for instance Kurt W. Schwogger, An outlook for metallocene and single site catalyst technology into the 21$^{st}$ century, Antec 98, Processing Metallocene Polyolefines, Conference Proceedings, October 1999, Rapra Technology, and Proceedings of 2$^{nd}$ International Congress on Metallocene Polymers, Scotland Conference Proceedings, March 1998. A preferred metallocene polyethylene for use in this invention is an ethylene based octene metallocene plastomer.

It is preferred that in addition to the block copolymer both a metallocene polyethylene and a polyethylene are included in the foaming composition. This way optimal melt strength and foamability are obtained.

While preparing the foaming composition the balance between the amount of block copolymer component and amount of the metallocene polyethylene and/or polyethylene component depends on the precise properties of the components that are selected to prepare the foam. It has been observed that a high amount of block copolymer component provides high flexibility, but may be detrimental to foamability if too high, while a high amount of the metallocene polyethylene and/or polyethylene component promotes foamability, but is detrimental to flexibility of the foam if too high. When a block copolymer comprising alternating blocks of crystalline blocks of linear MDPE and elastomeric blocks of ethylene/1-octene is used, a suitable foaming composition preferably comprises between 25 and 80 weight % of said one or more random polymers and 20 and 75 weight % of said block copolymer, based on the weight of the composition. Preferred compositions comprise between 30 and 70 weight % of said metallocene polyethylene (e.g. ethylene based octene metallocene) and/or polyethylene component (e.g. LDPE), such as between 30 and 60 weight % or between 40 and 50 weight % based on the weight of the composition. A suitable foam composition mixture may comprise for instance 60 weight % of said ethylene/α-olefin block copolymer, 10 weight % LDPE, and 15 weight % ethylene based octene metallocene based on the weight of the composition. Highly preferred foam composition mixture may comprise for instance 20-60 weight % of said ethylene/α-olefin block copolymer (such as 20 to 40 weight %), 10-20 weight % LDPE (such as 12.5 to 17.5 weight %), and 20-40 weight % ethylene based octene metallocene (such as 25 to 35 weight %) based on the weight of the composition. Such compositions result in foams having optimal melt strength with low foam density in combination with fine and closed cells, which makes these foams optimally suitable for insulation purposes. A suitable foam composition mixture may comprise for instance about 30 weight % of said ethylene/α-olefin block copolymer, about 15 weight % LDPE, and about 30 weight % ethylene based octene metallocene based on the weight of the composition.

To produce the foam according to the invention, a cell stabilizer is required. Such a cell stabilizer prevents the blowing agent from escaping from the polymer melt immediately after injection, as a result of which no foam is formed. Any cell stabilizer normally used in the art can be used as cell stabilizer, provided that it does not affect the properties of the foam. Examples of suitable cell stabilizers include cell stabilizers of the type stearic acid amide, glycol monostearate and fatty acids of glycine. It is also possible to use more than one cell stabilizer. The total quantity of cell stabilizer in the foam composition mixture may suitably be about 1-8% by weight, such as between 2-5 weight %, based on the total quantity of polymers and additives. In the production process, the cell stabilizer is suitably added by means of for instance a side feeder, to the polymer mixture before the mixture is melted.

Said foam composition mixture preferably comprises one or more additives selected from the group consisting of a flame retardant, a cell nucleator, a colourant, an isolation improver, an uv stabilizer, a processing aid, a processing stabilizer, and an anti-oxidant.

The foam according to the invention very low percentages of open cells (<10%), or, in other words, percentages of closed cells of 90% or more. The foam of the invention therefore can be indicated as a "closed cell foam". It is preferred that the foam has a percentage of open cells of 6 (+/−3) % or less, such as 8% or less, 7% or less, 6% or less, 5% or less, 4% or less, 3% or less, 2% or less, 1% or less or substantially no open cells. In accordance, the foam according to the invention has a high percentage of closed cells (90% or more). In accordance with the above, it is preferred that the foam has a percentage of closed cells of 94 (+/−3) % or more, such as 92% or more, 93% or more, 94% or more, 95% or more, 96% or more, 97% or more, 98% or more, 99% or more.

As mentioned above the foam of the invention has high insulation value, namely of 0.040 λ40, W/m·K and higher.

A suitable exemplary foam has a density of 10-45 kg/m$^3$, volumetrically determined, for instance 25-30 kg/m$^3$, a cross-section of cells between 0.30-0.80 mm and an insulation value of 0.035-0.040 λ40, W/m·K.

The non-crosslinked polyolefin thermal insulation foam according to the invention may suitably be made by extruding, using a physical blowing agent, a foam composition mixture as defined under the first aspect of the invention, in an extruder in accordance with the method of the invention, which comprises the steps of a) melting said mixture in the melting zone(s) of the extruder adjusted to temperatures of 160 to 220° C., at a pressure increasing from 1 bar up to 400 bar, b) injecting said physical blowing agent at an injection temperature of 140 to 220° C. and an injection pressure of 30 to 300 bar, c) cooling the molten mixture in one or more cooling zones adjusted to temperatures of 85 to 115° C., and d) extruding the mixture through an extrusion nozzle adjusted to a temperature of 85 to 115° C. and a pressure sufficiently high to keep any gas present in the mixture dissolved in the mixture.

The foam composition mixture preferably is a water-free mixture which is made by mixing the solid components contained therein. Polymers may suitably be provided in the form of granules.

As blowing agent any substance can be used that is liquid at high pressure, particularly the pressure prevailing in the extruder used for carrying out the method, but which substance evaporates at lower pressure. Non-limiting examples of the blowing agent comprise alkanes having 3 to 8 carbon atoms, such as for instance propane, butane, isobutane and hexane. The blowing agent is brought to a temperature of 140 to 220° C., such as 140 to 180° C., and a pressure of 30 to 300 bar and continuously injected into the melted mixture in the extruder.

It is important that the foaming composition is melted well in the extruder, i.e. the polymer is brought in the liquid phase resulting in such a viscoelastic behaviour that polymers and additives are mixed well into each other and that in a later stage also the physical blowing agent is incorporated well into the polymer mixture. When for the preparation of the polyolefin foam according to the invention a mixer is used in which only low shearing forces are exerted on the mixture, it is advantageous to choose such a temperature that the viscoelastic behaviour of the polymer and additives is almost equal.

A parameter to express viscous behaviour is the melt flow index (MFI) (the throughput of material at a certain temperature and pressure). It is preferred that polymers are used with MFI-values of <1.2 g/10 minutes at 2.16 kg @ 190° C. as determined in accordance with ASTM D1238, such as a MFI-value of 0.65. Such polymers are in particularly suitable for making large size insulation material. For the production of smaller size insulation material polymers with MFI-values of 2-5 g/10 minutes at 2.16 kg @ 190° C. as determined in accordance with ASTM D1238, such as an MFI value of 2.5 may be also suitable.

To obtain the low percentage of open cells as required for the foam of the invention an extruder pressure sufficiently high to keep any gas present in the mixture dissolved in the mixture is necessary in step d). Suitable pressures to keep the gas completely dissolved in the mixture may be determined by the skilled person depending on the particular settings of the extruder equipment. For instance, extruder pressures as measured between the cooling zones and the extruder nozzle of at least 23 bar are suitable, for instance between 23 and 30 bar. In particular examples, in case of production of tube insulation it is preferred that the extruder pressure between the cooling zones and the extruder nozzle does not exceed 40-45 bar, to avoid a risk of shape loss of the tubes. Realizing a suitable extruder pressure can be facilitated by using polymers having suitable MFI-values as as specified above, in combination with cooling the molten mixture in one or more cooling in step c) to a temperature near to and below the point of crystallisation of the polymers. For this purpose the one or more cooling zones are adjusted to temperatures of 85 to 115° C. To obtain optimal results, it is preferred that cooling takes place gradually or essentially gradually. The result of this is that the process of expansion takes place after the extrusion step d). The inventors have found that this leads to low percentages of open cells in the finished foam in the order of less than 10% open cells, such as 6 (+/−3) % or lower of open cells in the finished foam.

The one or more cooling zones can for instance be situated in the extruder or be situated in a melt cooler coupled to the extruder.

The method of the invention can suitably be carried out on a single or double screw extruder having an L/D between 30 and 60, provided with mixing parts and a static mixer having for instance a throughput of 50 to 600 kg/h.

The insulation material according to the invention suitably has a wall thickness of 3 to 50 mm at an inner diameter of 4-130 mm.

EXAMPLES

The following examples are meant to illustrate and not to limit the invention.

Example 1

To produce a foam composition a mixture was prepared by mixing the compounds listed below to obtain an exemplary foam composition for making an exemplary foam according to the invention (percentages are weight percentages based on weight of the composition:
  23.2% of LDPE;
  50% of an ethylene/α-olefin block copolymer comprises alternating blocks of crystalline blocks of linear medium-density polyethylene and elastomeric blocks of ethylene/1-octene;
  15% of an ethylene based octene plastomer produced with metallocene catalyst;
  2.5% of a glycerol monostearate/stearamide cell stabilizer;
  the remainder being additives (flame retardant, cell nucleator, isolation improver, processing aid/stabiliser, anti-oxidant).
The polymers used to prepare the foam according have MFI-values of <1.2 g/10 minutes at 2.16 kg @ 190° C. as determined in accordance with ASTM D1238.

Example 2

A single screw extruder of the type described above was provided with an open space of 5-100 mm$^2$, after which the number of revolutions was adjusted at 15-40 rpm. The foaming composition of example 1 was added. The melting zones of the extruder were adjusted at 160-220° C., the cooling zones were adjusted at 85-115° C. Blowing agent (propellant) was injected at an injection pressure of 67 bar and an injection temperature of approximately 170° in a quantity of 20-25 l/h (as liquid). The pressure in the extruder decreased to approximately 23-30 bar at the nozzle of the extruder, after which the mixture expanded to a foam having a density of 10 to 15 kg/m$^3$ in the form of pipe insulation having an internal diameter of 18-28 mm and a wall thickness of 20-30 mm. The foam has a density of 10-30 kg/m$^3$, volumetrically determined, for instance 10-15 kg/m$^3$, a cross-section of cells between 0.30-0.50 mm and an insulation value of 0.035-0.040 λ40, W/m·K, and is estimated to have a percentage of less than 6% of open cells.

Example 3

The properties of the pipe insulation prepared as described in example 2 were compared to a pipe insulation as described in the example of WO02/42679 which is made of a composition comprising predominantly metallocene polyethylene, but no block copolymer (Comparative example). The pipe insulation prepared as described in example 2 had similar thermal insulation characteristics compared to the pipe insulation of the comparative example. Elongation at break, also known as fracture strain, was also tested. Elongation at break is the ratio between changed length and initial length after breakage of the test specimen. It expresses the capability of a material to resist changes of shape without crack formation. The elongation at break was by tensile testing in accordance with EN ISO 527. From table 2 below it appears that the pipe insulation made with the foam of example 2 has improved elongation at break; it breaks at an elongation of 175%, while the pipe insulation of the comparative example breaks at an elongation of 104%.

TABLE 2

Elongation at break

| | Elongation at break (%) |
|---|---|
| Pipe insulation (example 2) | 175 |
| Pipe insulation (Comparative example) | 104 |

Figure 2:
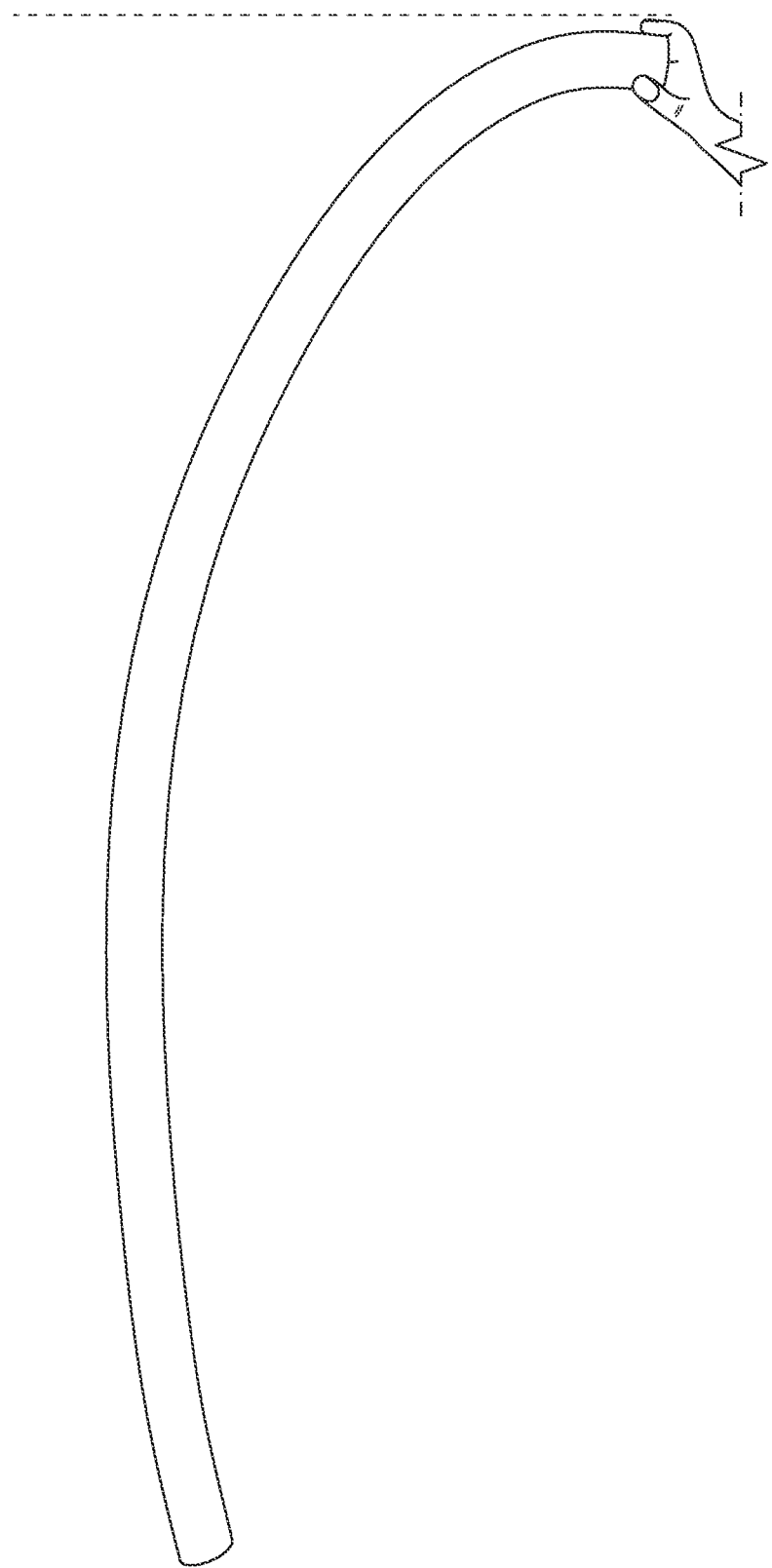
FIG. 2: Flexibility of a pipe insulation of an exemplary foam according to the invention.

The improved flexibility of the polyolefin thermal insulation foam of the invention is visualised in the photos shown in FIGS. 1 and 2. The pipe insulations shown in FIGS. 1 and 2 had the same dimensions. In FIG. 1 the pipe insulation of the comparative example was held in the air horizontal along the dotted line, manually holding one end and leaving the other end unsupported. In FIG. 2 the pipe insulation of example 2 was held in the air horizontal along the dotted line holding one end and leaving the other end unsupported. It is clear from the photos that the pipe insulation made of a foam according to the invention (FIG. 2) bends significantly more than the pipe insulation of the comparative example (FIG. 1), which shows that it has improved flexibility compared to the pipe insulation of the comparative example. This proves the enhanced flexibility of the polyolefin thermal insulation foam of the invention.

The invention claimed is:

1. A flexible non-crosslinked polyolefin thermal insulation foam having a percentage of open cells of less than 10% based on the total cells in the foam, and which is obtain by extruding a mixture comprising:
   i) an ethylene/α-olefin block copolymer, which comprises blocks of:
      A) crystalline or semi-crystalline blocks comprising ethylene in an amount of higher than 95 weight %; and
      B) elastomeric blocks comprising ethylene in an amount of 95 weight % or less and a comonomer content of 5 weight % or higher;
      wherein the ethylene/α-olefin block copolymer comprises alternating blocks of crystalline blocks of linear medium-density polyethylene, wherein medium-density is defined by a density range of 0.926-0.940 g/cm$^3$, and elastomeric blocks of ethylene/1-octene;
   ii) one or more random polymers with a density of between 0.880 g/cm$^3$ and 0.960 g/cm$^3$, selected from the group of a metallocene polyethylene and/or a polyethylene; and
   iii) a cell stabilizer;
   wherein the mixture comprises between 20 and 75 weight % of said ethylene/α-olefin block copolymer under i);
   in a process comprising the steps of
   a) melting said mixture in the melting zone(s) of the extruder adjusted to temperatures of 160 to 220° C., at a pressure increasing from 1 bar up to 400 bar,
   b) injecting said physical blowing agent at an injection temperature of 140 to 220° C. and an injection pressure of 30 to 300 bar,
   c) cooling the molten mixture in one or more cooling zones adjusted to temperatures of 85 to 115° C., and
   d) extruding the mixture through an extrusion nozzle adjusted to a temperature of 85 to 115° C. and a pressure sufficiently high to keep any gas present in the mixture dissolved in the mixture.

2. The flexible non-crosslinked polyolefin thermal insulation foam according to claim 1, wherein the thermal insulation foam has a percentage of open cells of 6 (+/−3) % or less based on the total cells in the foam.

3. The flexible non-crosslinked polyolefin thermal insulation foam according to claim 1, wherein cooling the molten mixture takes place gradually.

4. The flexible non-crosslinked polyolefin thermal insulation foam according to claim 1, wherein said α-olefin is a C3-C10 α-olefin.

5. The flexible non-crosslinked polyolefin thermal insulation foam according to claim 1, wherein said ethylene/α-olefin block copolymer has a density between 0.800 and 0.880 g/cm$^3$.

6. The flexible non-crosslinked polyolefin thermal insulation foam according to claim 1, wherein said polymers have MFI-values of <1.2 g/10 minutes at 2.16 kg @ 190° C. as determined in accordance with ASTM D1238.

7. The flexible non-crosslinked polyolefin thermal insulation foam according to claim 1, wherein said polyethylene under ii) is LDPE.

8. The flexible non-crosslinked polyolefin thermal insulation foam according to claim 1, wherein said metallocene polyethylene under ii) is an ethylene based octene metallocene.

9. The flexible non-crosslinked polyolefin thermal insulation foam according to claim 1, wherein said one or more random polymers comprise both metallocene polyethylene and polyethylene.

10. The flexible non-crosslinked polyolefin thermal insulation foam according to claim 1, wherein said mixture comprises one or more additives selected from the group consisting of a flame retardant, a cell nucleator, a colourant, an isolation improver, an UV stabilizer, a processing aid, a processing stabilizer, and an anti-oxidant.

11. The flexible non-crosslinked polyolefin thermal insulation foam according to claim 1, wherein the mixture comprises between 25 and 80 weight % of said one or more olefin based polymers under ii).

12. The flexible non-crosslinked polyolefin thermal insulation foam according to claim 1, wherein the mixture comprises 20-60 weight % of said ethylene/α-olefin block copolymer, 10-20 weight % LDPE, and 20-40 weight % ethylene based octene metallocene based on the weight of the composition.

13. The flexible non-crosslinked polyolefin thermal insulation foam according to claim 1, which is in the form of the cylinder.

14. The flexible non-crosslinked polyolefin thermal insulation foam according to claim 1, which is in the form of a sheet.

15. A method for making a flexible non-crosslinked polyolefin thermal insulation foam comprising extruding, using a physical blowing agent, a mixture as defined in claim 1, in an extruder, said method comprising the steps of
   a) melting said mixture in one or more melting zones of the extruder adjusted to temperatures of 160 to 220° C., at a pressure increasing from 1 bar up to 400 bar,
   b) injecting said physical blowing agent at an injection temperature of 140 to 220° C. and an injection pressure of 30 to 300 bar, c) cooling the molten mixture in one or more cooling zones adjusted to temperatures of 85 to 115° C., and d) extruding the mixture through an extrusion nozzle adjusted to a temperature of 85 to 115° C. and at a pressure sufficiently high to keep any gas present in the mixture dissolved in the mixture.

16. The method according to claim 15, wherein said mixture is a water-free mixture.

17. A method for thermally insulating a pipe comprising the steps of:
   (1) providing a flexible non-crosslinked polyolefin thermal insulation foam as claimed in claim 1 to an extruder; and
   (2) extruding the foam from the extruder onto a wall of the pipe.

* * * * *